(12) United States Patent
Lancaster

(10) Patent No.: US 7,908,298 B1
(45) Date of Patent: Mar. 15, 2011

(54) CALCULATING LIST

(75) Inventor: Robert C Lancaster, Lexington, KY (US)

(73) Assignee: Robert C. Lancaster, Lexington, KY (US)

( * ) Notice: Subject to any disclaimer, the term of this patent is extended or adjusted under 35 U.S.C. 154(b) by 342 days.

(21) Appl. No.: 11/836,174

(22) Filed: Aug. 9, 2007

(51) Int. Cl.
*G06F 17/30* (2006.01)

(52) U.S. Cl. ........................................ 707/805; 707/803

(58) Field of Classification Search .................. 707/803, 707/805
See application file for complete search history.

(56) References Cited

U.S. PATENT DOCUMENTS

| | | | |
|---|---|---|---|
| 7,167,869 | B2 | 1/2007 | Wedel et al. |
| 7,169,869 | B2 * | 1/2007 | Harada et al. ................. 526/287 |
| 2004/0193621 | A1 | 9/2004 | Moore et al. |
| 2004/0193672 | A1 | 9/2004 | Samji et al. |
| 2004/0199582 | A1 | 10/2004 | Kucharewski et al. |
| 2005/0183058 | A1 * | 8/2005 | Meijer et al. ................. 717/100 |
| 2006/0136390 | A1 * | 6/2006 | Zhao et al. ........................ 707/3 |
| 2006/0173961 | A1 | 8/2006 | Turski et al. |
| 2006/0209690 | A1 | 9/2006 | Brooke |
| 2007/0261102 | A1 * | 11/2007 | Spataro et al. .................... 726/2 |

OTHER PUBLICATIONS

"Building Relationships and Repeat Business with Email", Oct. 13, 2005, [online] [retrieved on Sep. 12, 2007] Retrieved from the internet <URL: http://www.constantcontact.com/aka/docs/pdf/building_relationships_2.pdf>, 11 Pages, Roving Software Incorporated d/b/a Constant Contact.

* cited by examiner

*Primary Examiner* — Khanh B Pham
*Assistant Examiner* — Johnese Johnson
(74) *Attorney, Agent, or Firm* — Vern Maine & Associates

(57) ABSTRACT

Processing list data to form calculated lists wherein the calculated data set is derived from data members and/or nested list members that are then calculated to produce the resulting final calculated data set. Each data member in the list typically has at least one data member identifier and at least one calculate attribute. The calculating process uses the calculate attribute to determine the final calculated data set of the list. The final calculated list can be used alone and additionally nested into other lists or as members of a list structure.

9 Claims, 10 Drawing Sheets

200

| List ID | Members | |
|---------|---------|---|
| | Member ID | Calculate Type |
| AAA | Bob | Calc |
| | Lea | Calc |
| | A List | Calc |

| List ID | Calculated Members |
|---------|-------------------|
| | Member ID |
| AAA | Bob |
| | Lea |

Fig. 3

| List ID | Members | |
|---|---|---|
| | Member ID | Calculate Type |
| List 4 | Lewis | Calc |
| 610 | List 2 | Calc |
| | | 620 |

| List ID | Members | |
|---|---|---|
| | Member ID | Calculate Type |
| List 5 | List 1 | Calc |
| | List 2 | Calc |
| 630 | List 3 | Calc |
| | | 640 |

| List ID | Members | |
|---|---|---|
| | Member ID | Calculate Type |
| List 2 | Sam | Calc |
| | Pat | Not |
| | Kim | Calc |
| 650 | List 1 | Calc |
| | | 660 |

| List ID | Members | |
|---|---|---|
| | Member ID | Calculate Type |
| List 1 | Jean | Calc |
| | Tim | Calc |
| 670 | Alex | Not |

| List Name | List ID | List Type | List For ID | Members | |
|---|---|---|---|---|---|
| | | | | Member ID | Calculate Type |
| MyList | AAA | List | n/a | Bob | Calc |
| | | | | Lea | Calc |
| | | | | A List | Calc |

{ 735

| List Name | List ID | List Type | List For ID | Members | |
|---|---|---|---|---|---|
| | | | | Member ID | Calculate Type |
| View | BBB | Privilege * | AAA * | Bob | Calc |
| | | | | Lea | Calc |
| | | | | A List | Calc |

CALCULATING LIST

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to data processing by a digital computer, and more particularly to calculating and representing processed and calculated list data.

BACKGROUND OF THE INVENTION

In the technology driven culture there is an overwhelming amount of data and information in electronic form. The problem with such an abundance of data is the ability to process such data in an efficient manner such that the user can quickly utilize the data. This is particularly noticeable in databases with multiple fields, and in particular, to a networked database with multiple users. The ability to enter, edit, organize and manipulate the data within the database tends to be less than ideal.

As is well known, a list is one of the most basic data structures in programming. It is typically a logically sequential order of elements, any of which can be accessed without restriction. Any element in the list can be removed, and its value can be read or modified. In addition, a new element may be inserted into any location in the list structure.

Physically, the elements of a list can be stored at various locations in memory, and the addresses of each element do not have to correlate in any fashion. The list is linked since each element points to the location of the next item. The dynamic representation of a list is called a linked list. Each element in the list is called a node, and contains two values, wherein the first is the data value that is to be stored. It should be noted that a linked list cannot be accessed randomly.

An Element can be anything, such as a predefined C++ type, a user defined class, or a pointer to one of these. There is a distinction between the logical list and a list data structure, since the internal structure of the class might not be a list at all. A logical list refers to the outside view of the list, so that the internal structure of the list could change without changing the interface. For instance, the internal data structure of the logical list could be based on a singly linked list, a doubly linked list, or a tree, and the interface will remain the same. This provides for flexibility in changing the data structures.

There are numerous database processing systems that attempt to provide satisfactory performance and usability with respect to the database entries. For example, the address and contact fields within a program, such as Microsoft Outlook, that allows for entry fields for names, addresses, email addresses, and telephone numbers are common database tools utilized in many applications. While useful, the fields are typically limited and inflexible and there is little opportunity to easily group and manage a collection of data fields.

What is needed, therefore, is a system for a more efficient way to structure and process data fields in order to organize and manipulate the data content. Such a system should provide the user with flexibility to process the database entries in a manner that is an optimal fit for the desired function.

SUMMARY OF THE INVENTION

One general embodiment of the invention is a system for data processing by a computer, including calculating and representing list data. The calculated lists can also be used to create higher structures or functions. In one embodiment, a recursive database for the list data provides the flexibility for processing.

One embodiment is a computer program embodied on a computer-readable medium for processing a data set of calculated members, the computer program performing list operations, including obtaining at least one data set of list members, wherein at least one of the list members have a member identifier element and at least one of the list members have a calculate attribute element. The program performs a calculating process on the list members, wherein the calculating process uses the calculate attribute element to process at least some of the list members to generate the data set of calculated members. It is noted that the calculated members can be an empty set. In addition, at least some of the calculated members are displayed to a user, such as on a screen of a computer monitor, a personal digital assistant or a mobile phone. At least some of the calculated members can also be stored on a storage device or transmitted elsewhere for further processing.

Another feature relates to the concept of nesting. At least one of the list members can reside in another data set of list members. In addition, one of the list members can reside in a plurality of data sets of list members. In certain applications, the list members do not contain a list member of itself at any level of nesting, because if the list were to contain itself, the processing might result in an endless loop.

The calculating process can be a variety of single step or multi-step processing according to the calculate attribute such as performing an arithmetic function on the list members.

Another feature relates to providing list attributes to enable logical list structures. The list attributes add further elements such as list type and list name that allow for the creation of logical list structures. One of the list type attributes includes setting a privilege, wherein the privilege allows for a multiple level privilege structure with multiple lists.

One embodiment is a computer readable medium having instructions for causing a computer to execute a method. The method includes retrieving an input list having a first list member element and a second list member element, the first list member element providing identification and the second list member element containing a plurality of input data members and at least one nested list. At least some of the input data members and nested list have a calculate attribute. At least some of the second list member element is typically stored on a storage device which can be any form of storage, including random access memory (RAM), read only memory (ROM), flash memory and hard drives. At least one nested list and at least some of the input data members are recursively processed to determine calculated members based on the calculate attribute to produce a final calculated data set.

According to one aspect, the nested list is processed before the input data members. Another feature includes having the nested list itself be another calculated data set.

The system may include at least one additional list, wherein at least one additional list could be viewed as a member of a structure that performs certain functions within the system. A structure according to one embodiment is composed of calculating lists which are structure members. One example of a structure member is a calculating list for granting or restricting access to a typical list. This structure member list is a structure member of the privileges structure. In one embodiment the privileges structure can comprise three structure member lists. The system utilizes the three privileges structure members to determine the appropriate access to the list that the particular privileges structure is assigned too. This embodiment is an example of a three tier privileges structure.

The recursive processing in one embodiment is a calculating process with a predefined automation. The automatic action feature can be triggered by certain events and perform some pre-defined routine or processing with respect to the input data members.

An additional aspect relates to adjusting or otherwise manipulating the calculate attribute. The adjusting can be dynamic and/or interactive such as by a user or be adjusted by the system according to some processing functions.

A further embodiment is a calculating list system, comprising a means for obtaining at least one input list, each input list defined by a first member element providing identification and a second member element having at least one data member with at least one data member having a calculate attribute. There is a calculating process section manipulating at least some of the data members according to the calculate attribute producing a calculated list. A storage device can be used to store the calculated list or some portion thereof which can be transmitted elsewhere, displayed or printed at any time.

The means for obtaining according to one embodiment is at least one of retrieving from a database and manual input.

One unique feature is the recursive nature of the lists which allows leveraging all the data member elements in all the lists. The lists can be updated/changed dynamically and also customized by the user. Another aspect includes automatic updates to lists and sublists.

The sharing of lists according to privileges is another feature as the lists can have permissions that regulate access according to the various levels of permission such as view and edit.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 2 is block diagram of a calculating list's member data in tabular form configured in accordance with one embodiment of the present invention.

FIG. 3 is block diagram of a calculating list's calculated member data in tabular form configured in accordance with one embodiment of the present invention.

FIG. 6 is block diagram representing additional aspects for calculating lists configured in accordance with one embodiment of the present invention.

FIG. 7 is block diagram representing privilege aspects for calculating lists configured in accordance with one embodiment of the present invention.

DETAILED DESCRIPTION

The term "list data" refers to data members that are organized as a list. The term "calculating list" refers to list data where at least one of the data member's elements is an attribute to be interpreted when calculated. Additionally, a list's data member can be a calculating list itself. A list within a list is known as a nested list. Calculating lists can include any number of nesting levels. Calculating a list produces a final calculated data set based on each data member's calculated attribute. The calculation can be performed recursively for each nested list to produce the final calculated data set.

Calculating lists offer the advantage of aggregating any number of lists to produce a new calculated data set, thereby giving the user the ability to leverage existing lists to produce new lists, customized implementations, and enhanced information access. Furthermore changes to a nested list may effect changes in the parent list's calculated data set resulting in an updated or current list throughout the other lists.

Figure 1:
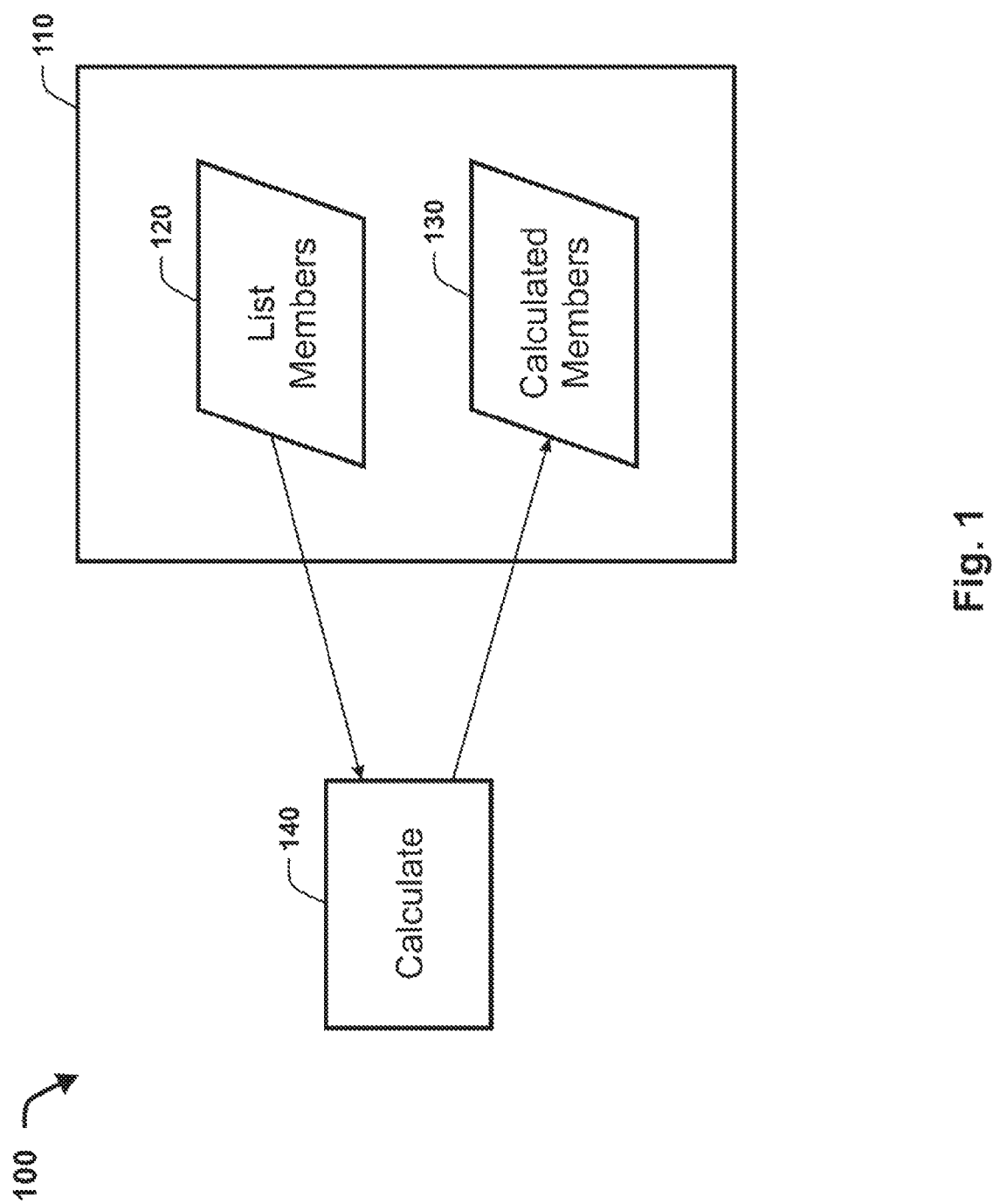
FIG. 1 is a high level block diagram of a calculating list configured in accordance with one embodiment of the present invention.

FIG. 1 is a high-level block diagram of calculating list system 100 including a calculating list 110 in accordance with an aspect of the present invention. Calculating lists 110 can be represented as data sets 120, 130 and a calculate process 140.

The data set of list members 120 represent data members of the list that are the subject or input for the calculate process 140. The data set for the calculated list members 130 represents data members of the list member 120 that are the product or end result of the calculate process 140.

In one embodiment, the input list members 120 can be an entire database of data field entries or any portion thereof. The database of list members 120 can be limited based on such things as permissions of users or applications as detailed herein.

The calculate process 140 can represent a single process or multiple processes depending upon the desired output of the calculated list members 130. The calculated list members 130 can represent all or any portion of the input list members 120 depending upon the calculate process 140. And, there can be multiple calculating lists 110 operating on some or all of the list member data 120 providing different data sets in the calculated members 130 for different purposes. Other calculating lists do not affect member 120 and 130 in any way and can only incorporate members 130 in their calculations.

For illustrative purposes, calculating list members can be represented in a table where each row of the table represents a data member and each column of the table represents a member element. This is illustrated in FIG. 2. The member data can be anything but in the illustrated examples are alphanumeric characters representing names such as in an address book.

FIG. 2 shows a table 200 of input list members 210 that stores the list subject data. The first column of table 200 represents the first member element 220 of each list member. In the example shown, the first member element 220 stores the list ID of the members, shown as 'AAA'. The second column of the table 200 represents the second member element 230 of the members. In the example shown, the second member element 230 stores the member ID of the members, such as 'Bob', 'Lea', and 'A List'. The third column of the table 200 represents the third member element 240 of the members. In the example shown, the third member element 240 stores the calculate attribute of the members, which in this example is shown as 'Calc', which would typically represent the type of processing to be performed. The processing can be a variety of processes including arithmetic operations of the data members. The second and third column member elements 230, 240 are grouped fields under a common header for Members. It should be readily understood that the usage of numerical identifiers such as 'first' and 'second' are for convenience to distinguish the various elements to clarify the operational functionality and is not to be deemed as limiting or restricting.

Calculating lists can have nested calculating lists as members. In the example shown in FIG. 2, the member ID 250 is another calculating list.

Calculated members from the calculating list can also be represented in a table where each row of the table represents a data member and each column of the table represents a member element. This is illustrated in FIG. 3.

FIG. 3 shows an illustrative table 300 of calculating members 310 that stores the list product data. The first column of table 300 represents the first calculated member element 320 of each member. In the example shown, the first calculated member element 320 stores the list ID of the calculated members. The second column of the table 300 represents the second calculated member element 330 of the calculated members. In the example shown, the second calculated member element 330 stores the calculated member ID of the members. The calculated members typically can not be nested calculated lists such as those referenced in FIG. 2, member ID 250.

Figure 4:
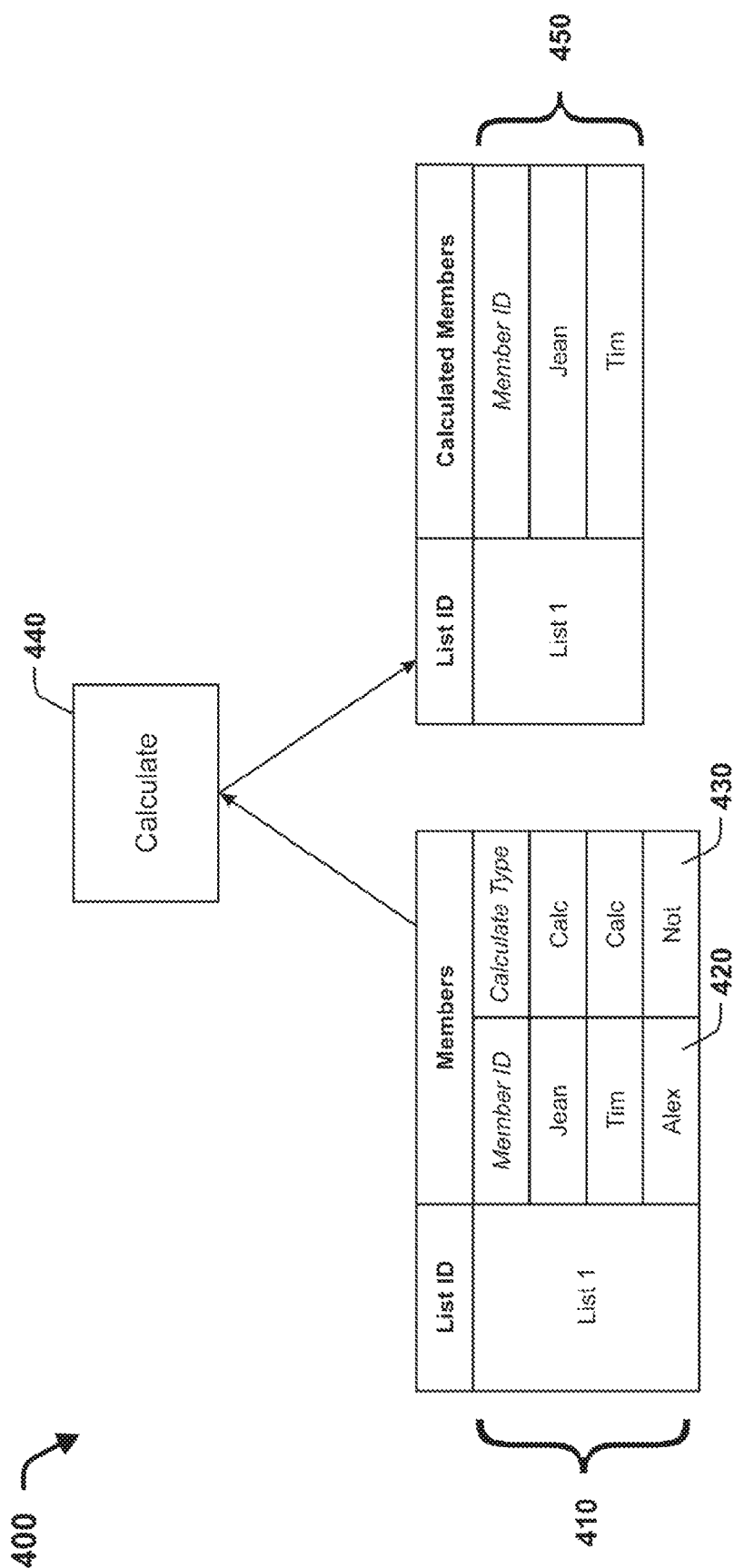
FIG. 4 is block diagram of a representation of a calculating list configured in accordance with one embodiment of the present invention.

FIG. 4 shows, in one embodiment, a calculating list 400. In the example shown, a table that represents the list members 410 and a table that represents the list calculated members 450 are shown along with a calculate process 440.

In general, a product is operable to cause the data processing system to perform the calculate process 440. The calculate process 440 evaluates or selects the appropriate list members 410 performs the calculate process 440 and produces the calculated members 450.

In particular detail, for the input list members 410, the first member element is the List ID, for which the data member is 'List 1'. The second member element is the Member ID for data members 'Jean', 'Tim', and 'Alex' 420. The third member element is the Calc Type, which in this example is 'Calc', 'Calc', and 'Not' 430.

As illustrated, the first calculated member element is the List ID which is the List 1 data member. The second calculated member element is the Member ID, which includes only 'Jean' and 'Tim'. In this example, the calculated members 450 do not include the member ID for 'Alex' 420. The calculate process determined that the member ID 420 was not to be included in the calculated members 450 by interpreting the calculate attribute 430. Likewise, the calculated members 450 excluded the data member 'Alex' 420 as determined by the Calc type attribute 'Not' 430 when processed by the calculate process 440. It should be readily apparent that a valid calculated member is an empty data set. If the calculated member set in one example was an empty member set, the result would be displayed as an empty data set.

Figure 5:
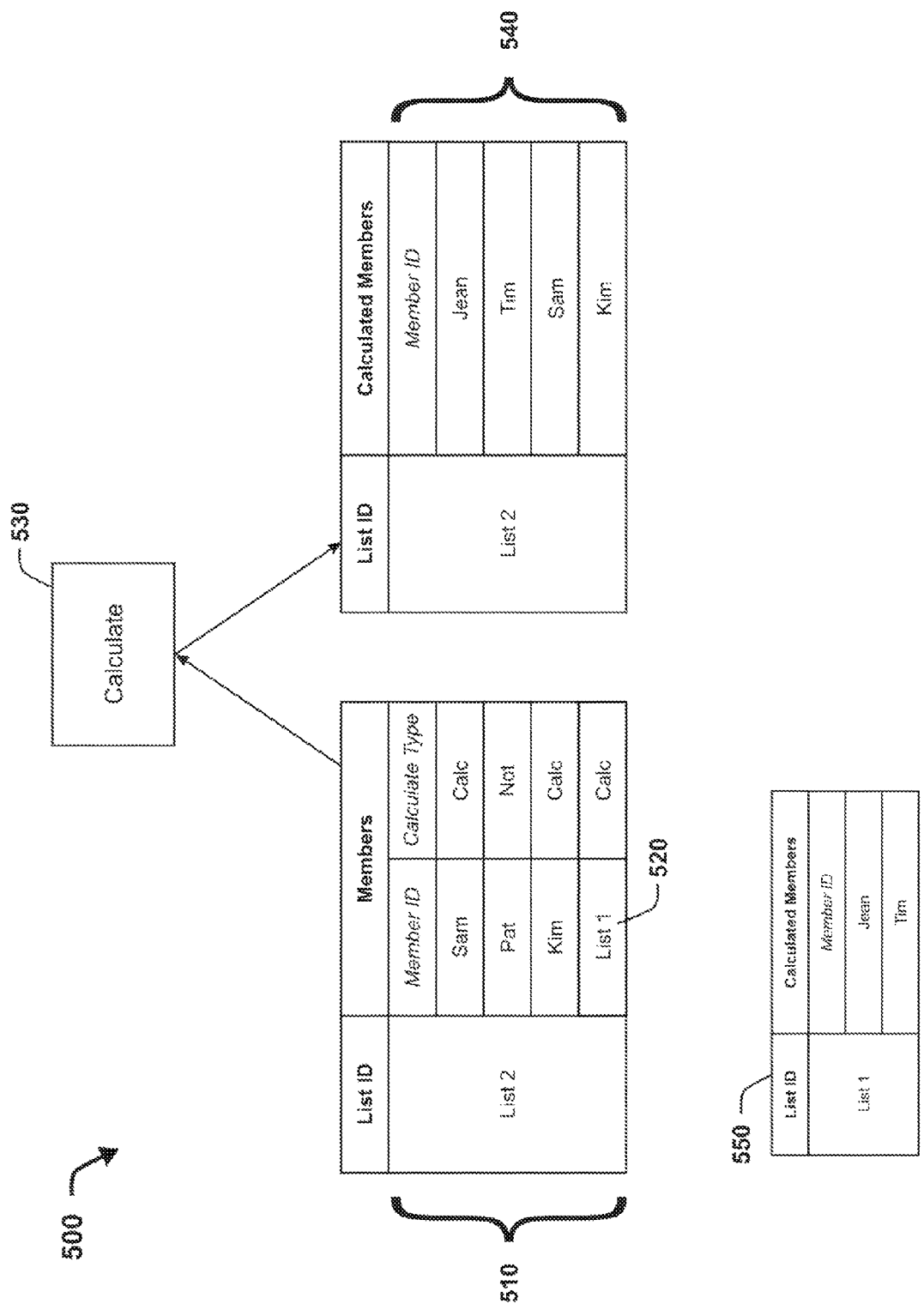
FIG. 5 is block diagram of another representation of a calculating list configured in accordance with one embodiment of the present invention.

FIG. 5 shows another embodiment of a calculating list system 500. In the example shown, a table that represents the list members 510 and a table that represents the list calculated members 540 are shown along with the associated calculate process 530. A table that represents a second calculating list's calculated members 550 is also shown.

In this example, the list members 510 include a member ID which represents a nested calculating list 'List 1' 520. The calculate process 530 first determines the calculated members for each nested list member, recursively. In the example shown, list member 520 is calculated and then its calculated members 550 are returned and calculated with the remaining members to produce the calculated members 540.

In more particular detail, the first member element is List ID for the corresponding List 2. The second member element for Member ID shows data members 'Sam', Pat', 'Kim', and the nested list 'List 1' 520. The third member element for the Calculate Type shows the corresponding data members 'Calc', 'Not', 'Calc', and Calc'. The nested calculating list List 1 550 shows the calculated members include 'Jean' and 'Tim'.

After the input list members 510 are processed by the calculate process 530, the calculated list 540 includes the first calculated member element of the List ID for the corresponding data member 'List 2'. The second calculated member element indicates the Member ID for data members 'Jean', 'Tim', 'Sam', and 'Kim'.

FIG. 6 shows, additional aspects of nested calculating lists 600. Any calculating list can be a nested member of any other calculating list and may be a member of many different calculating lists. In the example shown, calculating list 670 is a member 640 of calculating lists 630 and a member 660 of calculating list 650.

In another aspect, a calculating list can not contain a member of itself at any level. In the example show, calculating list 610 could not become a list member of calculating list 670 because one of calculating list 610's members 620 is nested calculating list 650 which has the nested calculating list member 660 which is calculating list 670. Effectively, calculating list 670 is a member of calculating list 610 one level deep and hence violates the rule that a calculating list can not contain a member of itself at any level.

Figure 8:
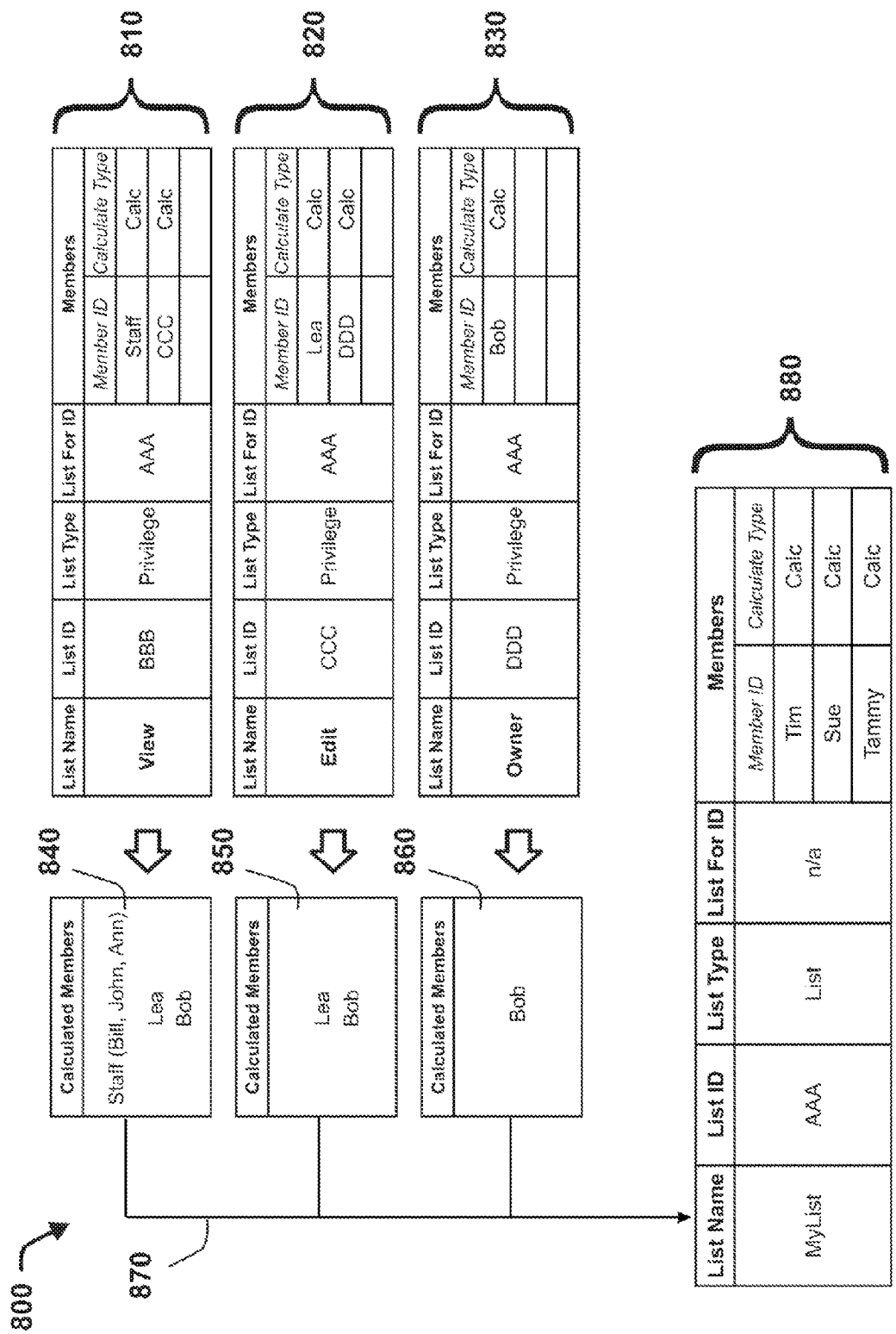
FIG. 8 is more detailed block diagram representing privilege aspects configured in accordance with one embodiment of the present invention.

Referring to FIG. 7 and FIG. 8, additional elements allow for development of logical list structures. FIG. 7 shows two lists, named MyList 735 and View 740. This example shows some additional elements including List type 715 and List for ID 720 which can be used to generate logical list structures.

In more particular detail, referring to the MyList list 735, there is a List Name 705 associated with the List ID 710. There is also a List Type 715 and a List for ID 720. The additional fields allow for the creation of logical list structures. The members for the MyList list 735 include Bob, Lea and A list. The additional elements, List Type and List for ID provide a mechanism for the application to define the list structures. The application uses two or more lists to accomplish a special task or function by using the List for IDs to identify members of a structure. Thus, the application defines and interprets list structures composed of many lists by appropriately traversing the List for IDs of a particular instance of a structure. However, a list itself is not aware of the structure of any of the structures members (its peers) and many lists do not even contain a List for ID.

As noted in the list named 'View' 740, the list type attribute 'Privilege' 745 provides a mechanism to determine a user's access level to a list. The List For ID 750 identifies that list 740 is to be a privileged list for List Named 'MyList' 735 with List ID 'AAA' 710.

FIG. 8 shows, in general, that additional lists can be added to create a logical structure of privileges or any other desired logical structure. Lists named 'View' 810, 'Edit' 820 and 'Owner' 830 are added to create a three tier privileges structure.

In more particular detail, to determine if a user has edit privileges for the list named 'My List' 880 the calculated members of the list named 'Edit' 850 is examined. If the user's ID is contained in the 'Edit' list 850 then privileges are granted. The other privileges are utilized in the same way 840 and 860 respectively.

In another aspect, logical structures consist of one or more calculating lists. In this example the List For ID of lists 810, 820 and 830 point to List ID 'AAA' which is List Name 'MyList' 880. Lists combined to form a logical structure can point to any list which can lead to logical structure lists pointing to lists inside other logical structure lists. Lines 870 represent the logical structure pointing to 'MyList' 880. It should be readily apparent that the privileges allow for a multiple level privilege structure with multiple lists.

Figure 9:
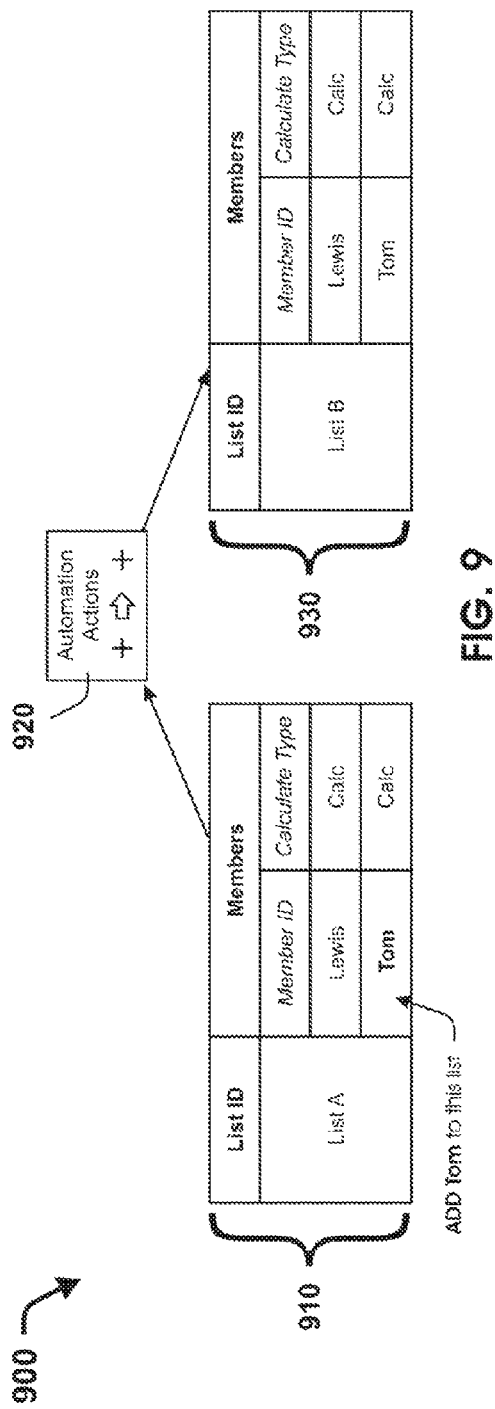
FIG. 9 is block diagram showing list automation configured in accordance with one embodiment of the present invention.
Figure 10:
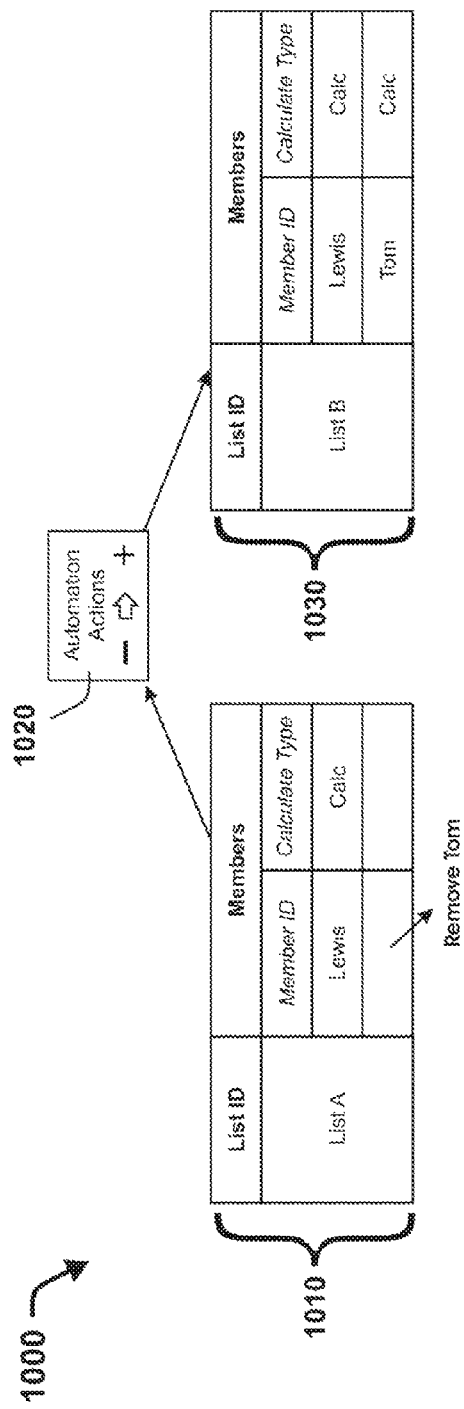
FIG. 10 is block diagram showing further list automation configured in accordance with one embodiment of the present invention.
Figure 11:
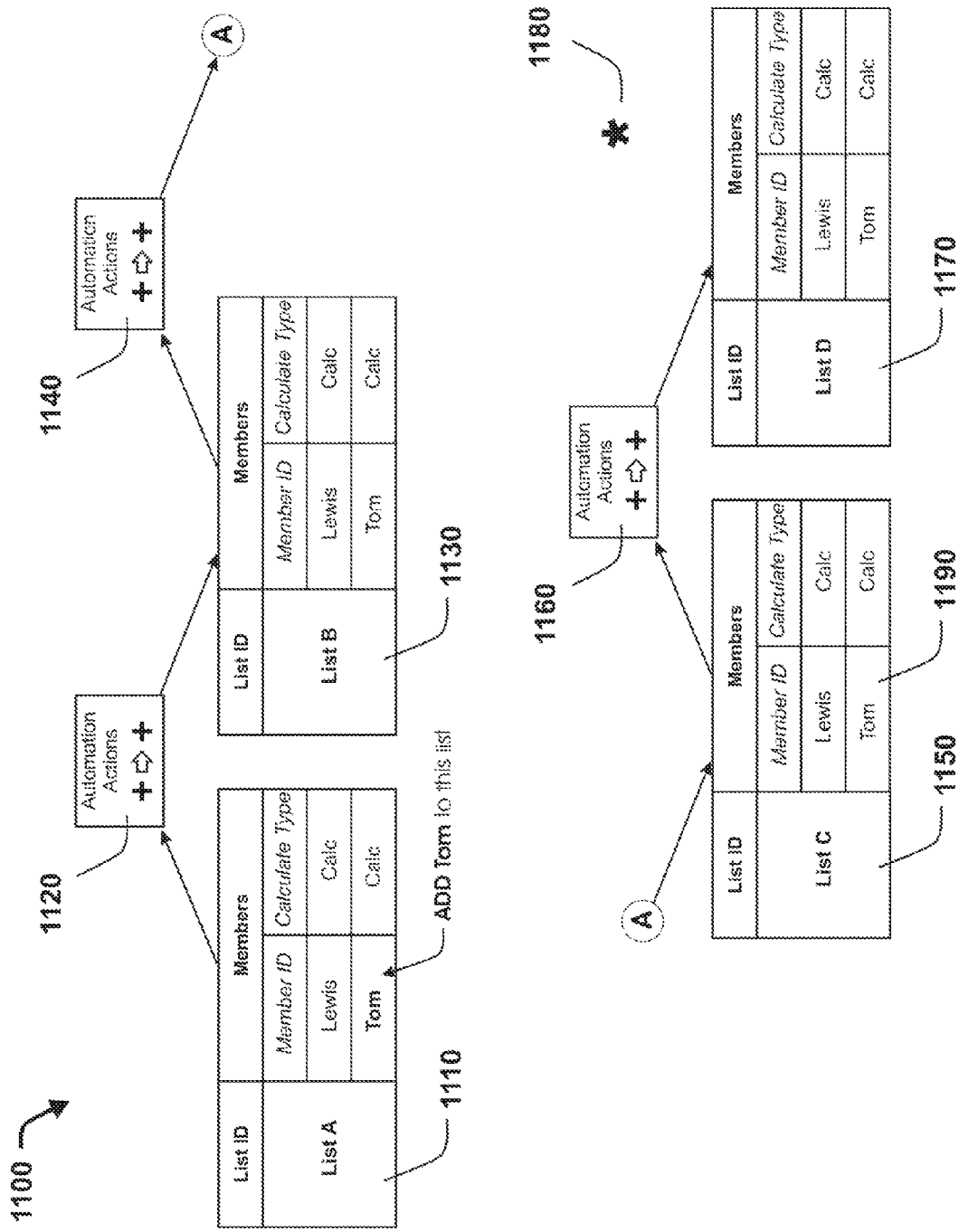
FIG. 11 is block diagram showing a chain of list automation configured in accordance with one embodiment of the present invention.

An example of list automation is shown in FIGS. 9-11. As noted in these figures, the lists can trigger actions when member data is changed, for example, by adding or removing member data from a list. In FIG. 9, Tom is added as a member to List A 910 which is subject to an Automatic Action 920. This optional Automatic Action process section 920 can be a pre-defined routine according to one embodiment. As noted herein, the automated action is denoted as a 'plus-plus' process that subsequently also adds Tom to List B 930.

Referring to FIG. 10, with the Automatic Action section 1020 denoted as a 'minus-plus' process, when Tom is deleted from List A 1010, he is automatically added to List B 1030.

The Automatic Action processor in this example is shown only for addition and deletion of members, however other actions are within the scope of the invention. This pre-defined process allows for automated processing according to design criteria.

In more particular detail, a list can have one or more Automatic Actions. In this example there are two Automatic Actions associated with List A, actions 920 and 1020.

Referring to FIG. 11, a chain of actions takes place from a single member change. Adding Tom as a member to List A 1110, causes an automatic change in the associated lists 1130, 1150, 1170 and adds Tom to each corresponding list according to the automatic actions section 1120, 1140, 1160. Once again, the automatic actions section can be used to perform various manipulations and is not limited to simple addition/subtraction.

In more particular detail, the execution of an Automatic Action chain is completed when there are no more actions to execute or the action was not necessary. In the example 1180 denotes the lack of an Automatic Action and hence the action chain is complete. In another example, action 1140 will add Tom to List C 1150 but if Tom 1190 was already in the list then the action chain is terminated because action 1140 did not actually add Tom and change List C 1150. Hence, action 1160 would not be triggered and List D 1170 would not have Tom as a member.

Having described and illustrated certain functionality of the invention with reference illustrated embodiments, it will be recognized that the illustrated embodiments can be modified in other arrangements and details without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

Figure 12:
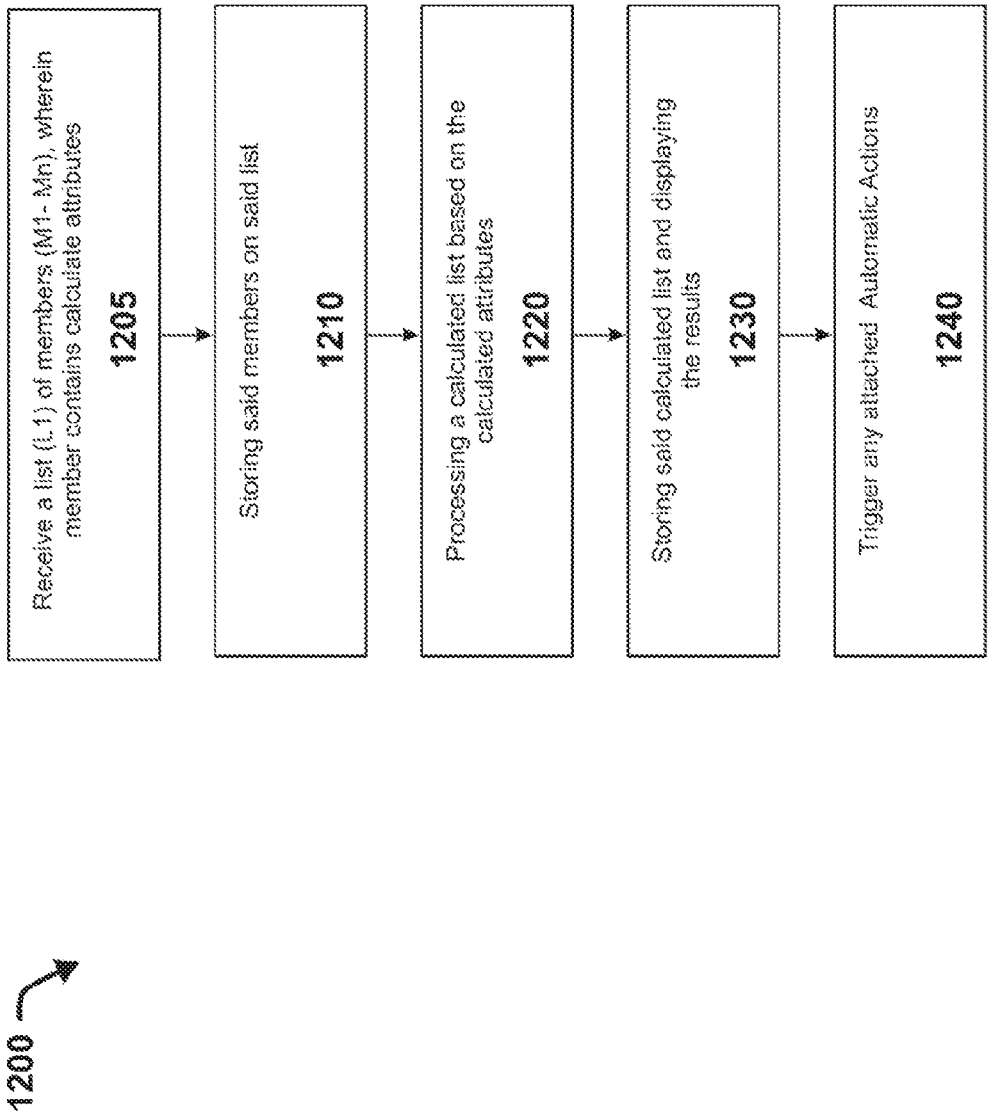
FIG. 12 is flow chart illustrating processing configured in accordance with one embodiment of the present invention.

Referring to FIG. 12, a process flow according to one embodiment is depicted. The data processing apparatus receives a list L containing members M1-Mn 1210 which as stored 1220. Each member is comprised of at least one member identifier element and at least one calculate attribute element. List L also contains calculated members C. Note that a calculating list can contain nested calculating lists. Calculated members are comprised of at least one member identifier element. The calculated members are selected from list L members by the calculating process. The calculating process examines each member's calculate attribute to determine which members to include in the calculated member set 1230. After storing and calculating any Automatic Actions associated with L are executed 1240.

In general, in another embodiment, the system receives a list L' containing members M, and L to be stored. A calculating list can contain nested calculating lists, and List L' has a nested list member L. List L' contains its calculated members. The calculated members are selected from list L' members by the calculating process. The calculating process first calculates any members that are lists, recursively, to determine their calculated members. The nested list L calculated members and list L' members are calculated to determine list L's calculated members. Calculated members do not contain lists as members. After storing and calculating any Automatic Actions associated with L are executed 1240.

One example of the operation of the system for illustrative purposes is the development of a newsletter database wherein a user wishes to send out a newsletter. The newsletter database would be given an appropriate identification list name. The list items such as names/addresses would be used for the development of the list and these can be entered in a number of ways such as manual entry or by retrieval from other lists and databases. For example, other lists such as clients, competitors, prospects and employees may be pre-existing and the system easily incorporates lists and sublists from existing data. An entire list such as clients can be added as list members of the newsletter database which may include nested lists and sublists. The prospect list can be easily modified via the calculate attribute to exclude certain list members. Likewise, there may be established privileges or list elements that prevent inclusion of certain data members. The final calculated data set is assembled based on the provided input list less those restricted or otherwise not permitted. The final calculated list can automatically check for duplicate entries based on any of the fields such as name or email address to avoid repetition. The final calculated list can then be used to mail or email the newsletter to the members of the list. A further feature is a highlight function that automatically propagates to every list wherein the user can quickly sort by member role or attribute to modify or create additional lists. Another feature is comparing relationships between two lists by showing which members are present in both lists. Another aspect of a lists is the ability to determine who sponsored/added a member to the list. In addition, unlike the typical automation of the state of the art systems, the present invention provides for dynamic generation/manipulation of the lists. As used herein, passive automation refers to automation that happens without a designer overseeing the automation process. For example, the owner of a prospect list which is a member of the newsletter list typically has no knowledge of the newsletter list or that the prospect list is being used to help form the newsletter list and generally identifies prospects. However, the owner of the prospect list is "passively" helping to maintain the integrity of the newsletter list.

The invention can be implemented to include one or more of the following advantageous features. Calculating lists can contain nested calculating lists as members which provide more than one level of nesting. Calculating list members contain a calculate attribute element which can be set to change the resulting calculated member set.

A further example of the arithmetic function of a calculating list will be demonstrated by manipulation of a newsletter list. For example the newsletter list contains five nested sublists—"customers", "employees", "prospects", "president's friends" and "competitors", each being member lists. Each of these member lists are maintained or utilized by other users besides the user that maintains the newsletter list. The competitors list is marked by the newsletter's user with the mathematical indicator "Not". Additionally, the president's friends list is marked with the indicator "Include/Absolute".

When the newsletter list is calculated, the sublists customers, employees and prospects are combined into a temporary dataset of all items without duplicating any item. Then this temporary dataset is compared to the competitors list which is marked "Not". If any of the items in the temporary dataset also exists in the competitors list, the items are removed from the temporary dataset.

Finally, the president's friends list of items is added to the temporary dataset without any duplication because it is marked "Include/Absolute". The president's friends list of items is included regardless of the item's appearance in the competitors list. The resulting temporary dataset then becomes the new calculated members of the newsletter list. Because all of the newsletter sublists members are maintained by separate users the newsletter list will always be up-to-date and accurate when viewed.

The invention can be implemented to realize one or more of the following advantages. Calculating lists offer the advantage of aggregating any number of lists to produce a new calculated data set, thereby giving the user the ability to leverage existing lists to produce new lists and new insights. Furthermore changes to a nested list may effect changes in the parent list's calculated data set resulting in an updated or current list. Using nested lists gives calculating lists the added benefit of logic or intelligence. These features are an improvement over conventional lists.

One of the features of the invention relates to processing list data to form calculated lists, wherein a calculated list is a set of data that represents the list's title or purpose. The calculated data set is derived from the list's own data members and/or nested list members which are then calculated to produce the resulting calculated data set. Each data member in the list is typically comprised of at least one data member identifier element and at least one calculate attribute element. The calculating process uses the calculate attribute to determine the final calculated data set of the list, and the final calculated list can be used alone and additionally nested into any other lists.

In operation according to one embodiment, the user inputs the original data members and/or selects the data lists and calculating lists that are to be processed. The user also can influence the final calculated results by altering the list data and making selections of the various nested lists.

In view of the many possible embodiments to which the principles of our invention may be applied, it should be recognized that the detailed embodiments are illustrative only and should not be taken as limiting the scope of the invention. Rather, what is claimed includes all such embodiments as may come within the scope and spirit of the following claims and equivalents thereto.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A computer program embodied on a non-transitory computer-readable medium for processing an input data set to produce a calculated data set of at least one calculated list including calculated members, said computer program performing list operations, comprising:
    obtaining at least one said input data set for at least one calculating list comprising one or more list members, wherein at least one of said list members has a member identifier element and at least one of said list members has a member calculate type element;
    wherein each of said at least one calculating list has one list identification element specifying said calculating list;
    wherein each of said at least one calculating list has one list name element identifying commonality of said list members;
    wherein said list members of said at least one calculating list can comprise a calculating list member that is a calculating list other than parent of said calculating list member, thereby supporting nesting and avoiding endless loop processing;
    wherein said list members can be an empty set;
    wherein at least one said member identifier element is input in a columnar list arrangement by a user;
    wherein said member identifier element can be included in multiple calculating lists;
    wherein said member calculate type element represents a type of processing to be performed;
    performing a calculating process on said list members, wherein said calculating process uses said member calculate type attribute element to process at least some of said list members to generate said calculated data set of said at least one calculated list including said calculated members;
    wherein said calculating process traverses said list members, processing said list members that are said calculating list members first to determine calculated members of said calculating lists corresponding to said calculating list members;
    wherein said calculating process interpretation of a negative member calculate type element results in omission of said list member having said negative member calculate type element from said at least one calculated list;
    wherein said calculating process uses said one list identification element for creation of logical list structures;
    wherein said calculating process uses said one list name element for creation of logical list structures;
    wherein said calculating process leverages knowledge by sharing said at least one calculated list among users;

wherein said calculating process does not require user programming, operating on input data set values entered for said at least one calculating list;

wherein said calculated members of said at least one calculated list do not contain lists as said calculated members;

wherein said data set of said calculated members can include an empty data set;

wherein said at least one calculated list contains no duplicate calculated members; and displaying at least some of said calculated members to said user; wherein said displaying includes rendering at least one table wherein said calculated members are in a columnar arrangement.

2. The program according to claim 1, further comprising storing said at least some of said calculated members on a storage device.

3. The program according to claim 1, wherein said displaying is on a device selected from at least one of the group consisting of: computer, personal digital assistant, and mobile phone.

4. The program according to claim 1, comprising nesting, wherein at least one of said list members is another calculating list.

5. The program according to claim 1, comprising nesting, wherein one of said list members is a calculating list and is in a plurality of calculating lists.

6. The program according to claim 5, wherein said list members do not contain a list member of itself at any level.

7. The program according to claim 1, wherein said calculating process is an arithmetic function.

8. The program according to claim 1, further comprising list elements to enable logical list structures wherein said at least one calculating list comprises elements list type element and list for identification element whereby said list for identification element and said list type element define resultant list structures.

9. The program according to claim 8, wherein a list structure comprised of multiple calculating lists assigns list privilege with said list type element;

wherein said list type element of a privilege calculating list identifies privilege, said one list name element identifies one of multiple levels of privilege, and said list for identification element identifies list identification element of a second calculating list to which said list privilege is assigned.

\* \* \* \* \*